United States Patent
Sohn et al.

(10) Patent No.: US 7,598,318 B2
(45) Date of Patent: Oct. 6, 2009

(54) THERMOSENSITIVE AND BIOCOMPATIBLE AMPHIPHILIC POLY(ORGANOPHOSPHAZENES) AND PREPARATION METHOD THEREOF

(75) Inventors: Youn Soo Sohn, Seoul (KR); Ji Yeon Seong, Gyeonggi-Do (KR); Yong Joo Jun, Seoul (KR); Joo Ik Kim, Gyeonggi-Do (KR)

(73) Assignee: EWHA University - Industry Collaboration Foundation, Seoul (KR)

( * ) Notice: Subject to any disclaimer, the term of this patent is extended or adjusted under 35 U.S.C. 154(b) by 583 days.

(21) Appl. No.: 11/229,525

(22) Filed: Sep. 20, 2005

(65) Prior Publication Data

US 2006/0063910 A1    Mar. 23, 2006

(30) Foreign Application Priority Data

Sep. 22, 2004   (KR) .................. 10-2004-0076063

(51) Int. Cl.
C07F 15/00 (2006.01)
C08L 85/02 (2006.01)
A61K 31/28 (2006.01)
C08G 79/00 (2006.01)
C08G 79/02 (2006.01)

(52) U.S. Cl. .................. 525/54.1; 525/54.11; 525/419; 525/420; 525/538

(58) Field of Classification Search ............... 525/54.1, 525/54.11, 419, 420, 538
See application file for complete search history.

(56) References Cited

OTHER PUBLICATIONS

Song, Soo-Chang et al. (1999). "A New Class of Biodegradable Thermosensitive Poymers. I. Synthesis and Characterization of Poly(organophosphazenes) with Methoxy-Poly(ethylene glycol) and Amino Acid Esters as Side Groups," *Macromolecules* 32(7): 2188-2193.

Lee, Bae Hoon et al. (2002). "A Thermosensitive Poly(organophosphazene) Gel," *Macromolecules* 35(10): 3876-3879.

Lee, Bae Hoon et al. (2002). "Thermosensitive and Hydrolysis-sensitive Poly(organophosphazenes)," *Polymer International* 51: 658-660.

Lee, Bae Hoon et al. (2002). "Synthesis and Characterization of Thermosensitive Poly(organophosphazenes) with Methoxy-Poly(ethylene glycol) and Alkylamines as Side Groups," *Bulletin of the Korean Chemical Society* 23(4): 549-554.

Kim, Joo Ik et al. (2004). "Synthesis and Characterization of Nanosized Poly(organophosphazenes)with Methoxy-poly(ethylene glycol) and Dipeptide Ethyl Esters As Side Groups," *Polymer* 45: 7083-7089.

Seong, Ji-Yeon et al. (2005). "New Thermogelling Poly(organophosphazenes)with Methoxypoly(ethylene glycol) and Oligopeptide As Side Groups," *Polymer* 46: 5075-5081.

*Primary Examiner*—Ana L Woodward
(74) *Attorney, Agent, or Firm*—S. Peter Ludwig (57) ABSTRACT

The present invention relates to a thermosensitive and biocompatible poly(organophosphazenes) represented by Formula 1, and a preparation method thereof:

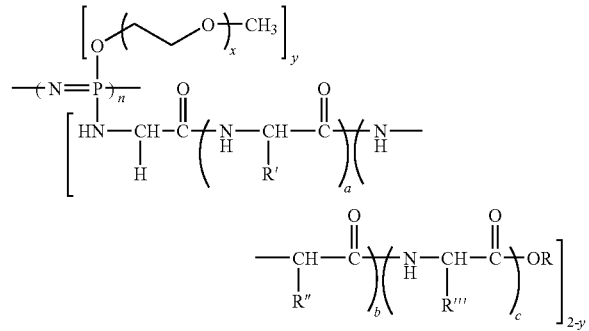

Formula 1 wherein R is a methyl or ethyl group; R' is selected from the group consisting of COOR, $CH_2COOR$, $CH_2CH_2COOR$, $CH_2CH(CH_3)_2$, $CH_2C_6H_5$, $CH(CH_3)CH_2CH_3$ and $CH_3$; R" is selected from the group consisting of $CH_2COOR$, $CH_2CH_2COOR$, $CH_2CH(CH_3)_2$, $CH_2C_6H_5$, $CH(CH_3)CH_2CH_3$ and $CH_3$; R''' is a group selected from the group consisting of $CH_2COOR$, $CH_2CH_2COOR$ and H, wherein R is the same as defined above; n is a number between from 30 to 100; x is a number selected from the integers of 3, 4, 7, 12 and 16; y is a number between from 0.5 to 1.5; a equals to 1; and b and c equal to 0 or 1.

11 Claims, 2 Drawing Sheets

Before Mixing

After Mixing with
Polymer of Example 1

FIG. 3

THERMOSENSITIVE AND BIOCOMPATIBLE AMPHIPHILIC POLY(ORGANOPHOSPHAZENES) AND PREPARATION METHOD THEREOF

BACKGROUND OF THE INVENTION

1. Field of the Invention

The present invention relates to a biocompatible amphiphilic poly(organophosphazene) that exhibits a temperature-dependent phase transition and a preparation method thereof.

2. Description of the Background Art

In general, thermosensitive polymers refer to polymers that exhibit a temperature-dependent phase transition from liquid (sol) to gel or precipitate in an aqueous solution. Such phase transition may be reversible or irreversible. Such phase transition behavior is ascribed to the fact that at a lower temperature, the polymer molecules are uniformly dispersed in an aqueous solution by strong hydrogen bonding between the solvent water molecules and the hydrophilic parts of the polymer, but as the temperature is raised, such hydrogen bonding is weakened, while the intermolecular interaction among the hydrophobic groups of the polymer molecules increases to form a physical network. If the polymeric network is strong enough to retain the water molecules within the network, they form a gel, and the temperature at which the gel is formed is called "a gelation temperature." However, if the network is not strong, the water molecules are expelled out of the polymer network, resulting in precipitation of the polymer. The temperature at which the precipitate is formed is called "a lower critical solution temperature (LCST)." The phase transition temperature of the thermosensitive polymers depends on the hydrophilic to hydrophobic balance of the polymer molecule, which is determined by both contents and structures of the hydrophilic and hydrophobic (i.e., lipophilic) groups of the polymer. In general, the higher the content of the hydrophilic groups, the higher the phase transition temperature, while the higher the content of the hydrophobic groups, the lower the phase transition temperature. Such thermosensitive polymers have a great potential for applications in many different areas such as drug delivery systems, medical, environmental and biological sciences, and the like. Representative examples of thermosensitive polymers are poly(N-isopropyl acrylamide), polyethylene oxide copolymer, hydroxy-containing polymers, and polyphosphazenes (K. Park Eds., *Controlled Drug Delivery*, 485 (1997)). However, it has been reported that most of the known thermosensitive polymers are not only toxic, but also non-biodegradable, and therefore, they are not suitable for drug delivery. Although the recently reported thermosensitive block copolymers consisting of poly(lactic acid) and poly(ethylene oxide) are biodegradable (B. Jeong et al., Nature, 388, 860 (1997)), they become acidic when degraded in vivo, which may denature the protein drugs. Therefore, these copolymers are also not suitable for delivery of protein drugs, which will be the major drugs in the future.

Polyphosphazene is an inorganic/organic hybrid polymer, which was firstly synthesized by Allcock group in the United States (H. R. Allcock and R. L. Kugel, *J. Am. Chem. Soc.*, 87, 4216 (1965)). Polyphosphazene is a linear polymer in which its polymer backbone consists of alternating phosphorus and nitrogen atoms and organic substituents are linked to the phosphorus atoms as side groups, and exhibits a variety of different physical properties depending on the molecular structure of the side chains. Even though polyphosphazenes have good physical properties that organic polymers do not have, they could not have been widely used due to their high price, and therefore, only have been used for limited purpose. In particular, polyphosphazenes could not be developed as drug delivery systems because polyphosphazenes prepared for general purpose according to the conventional method developed by Allcock group are required to have a molecular weight higher than $10^6$ (Mw>$10^6$) for strong mechanical properties, but it is well known that the upper limit of the polymer molecular weight for glomerular excretion is approximately 70,000 [K. Park Eds., *Controlled Drug Delivery*, 52 (1997)] and therefore, the molecular weight of polyphosphazenes as biocompatible drug delivery systems should be controlled below 100,000.

The present inventors have discovered and reported that if aluminum chloride is used as a catalyst in the synthesis of poly(dichlorophosphazenes) from hexachlorocyclotriphosphazene ($N_3P_3Cl_6$) by thermal polymerization, it is possible to control the molecular weight of the chloropolymer depending on the amount of catalysts used (Youn Soo Sohn, et al., *Macromolecules*, 1995, 28, 7566), and have been developing various amphiphilic poly(organophosphazenes) therefrom for new drug delivery systems.

The present inventors have also reported that poly(organophosphazenes) obtained by stepwise nucleophilic substitutions of the chlorine atoms of poly(dichlorophosphazene) with a hydrophilic poly(ethylene glycol) and a hydrophobic amino acid exhibited thermosensitive properties by manifesting water-solubility under a certain temperature but precipitation above such temperature, and that these poly(organophosphazenes) are hydrolytically degradable in aqueous solution (Youn Soo Sohn, et al., *Macromolecules*, 1999, 32, 2188). However, it was found that these poly(organophosphazenes) mostly exhibited a phase transition temperature above body temperature, and in order to lower the phase transition temperature below body temperature, it was necessary to increase remarkably the mole fraction of the hydrophobic amino acid and/or to introduce more than two different types of amino acid esters. In particular, a poly(organophosphazene) gel with a gelation temperature below body temperature could be synthesized by employing α-amino-ω-methoxy poly(ethylene glycol) (AMPEG) instead of methoxy poly(ethylene glycol) (MPEG) (Youn Soo Sohn, et al., *Macromolecules*, 2002, 35, 3876), but animal experiments have shown that this gel was not biocompatible since this gel caused skin inflammation.

SUMMARY OF THE INVENTION

Therefore, an object of the present invention is to provide a new type of thermosensitive and biocompatible poly(organophosphazene), hydrophobic and hydrophilic properties of which can be controlled, and a preparation method thereof.

DETAILED DESCRIPTION OF THE PREFERRED EMBODIMENTS

The present inventors have discovered that the above-mentioned disadvantages of the conventional inventions could be overcome by introducing into the polyphosphazene backbone a FDA-approved poly(ethylene glycol) of a molecular weight of at least 100 as a hydrophilic group and then instead of amino acid, an oligopeptide ester having broader and stronger hydrophobicity compared with amino acids and enzymatic degradability as a hydrophobic group, and the resulting poly(organophosphazenes) are not only biocompatible but also exhibited a phase transition from sol to gel or precipitate, in a wide range of temperature including body temperature. In other words, in the present invention, by employing an enzymatically degradable oligopeptide ester having broader and stronger hydrophobicity compared with amino acid esters as a hydrophobic side group instead of amino acid esters, a new class of biocompatible poly(organophosphazenes) could be prepared which are suitable for delivery of protein drugs that may become the major drugs in the future.

The present inventors have also discovered that the hydrophobic oligopeptide side groups of the present poly(organophosphazenes) can promote strong hydrophobic interactions with hydrophobic drugs such as anticancer agent Taxol as well as peptide and protein drugs, so that the hydrophobic drugs as such can be solubilized to an injectable form in the aqueous solution of the present poly(organophosphazenes). Furthermore, the present inventors have discovered that the phase transition temperatures of these polyphosphazenes vary depending upon the relative mole ratio of the oligopeptide ester to the poly(ethylene glycol) and the structure of the oligopeptide used, and accordingly, the phase transition temperature of the polyphosphazenes can be controlled based thereon.

The present invention is based on the above-mentioned discoveries and has been accomplished by successive introductions of a methoxy poly(ethylene glycol) as hydrophilic group and then an oligopeptide ester as hydrophobic group into the polyphosphazene backbone resulting in thermosensitive and biocompatible poly(organophosphazenes), which exhibit a phase transition in a wide range of temperature including body temperature, and are biocompatible by gradual biodegradation in vivo causing no inflammatory response.

It has been well known that when polyphosphazenes are hydrolyzed in vivo, the polymer backbone consisting of nitrogen and phosphorus atoms is decomposed into ammonium phosphate, which is harmless to organism (Kathryn E. Uhrich, *Chem. Rev.*, 1999, 99, 3198), and the rate of hydrolysis decreases as the volume and the hydrophobicity of the side substituent on the polymer backbone increase (Youn Soo Sohn, et. al. *Macromolecules*, 1999, 32, 7820). However, it has been found that the poly(organophosphazenes) of the present invention did not exhibit any difference in the rate of hydrolysis compared with those involving amino acids as side group, and it has been confirmed that ammonium phosphate, poly(ethylene glycol), oligopeptides and amino acids that are harmless to human are generated when they are hydrolyzed.

The oligopeptide esters employed in the present invention have broader and higher hydrophobicity as well as more complex molecular structure than amino acids, and therefore, are believed to enhance intra- and intermolecular hydrophobic interactions among the oligopeptides of the polymer in aqueous solution, thus yielding more easily a gel or a precipitate than amino acids when hydrogen bonding between the water molecules and the hydrophilic poly(ethylene glycol) of the polymer are weakened at a certain temperature, which is called a lower critical solution temperature (LCST). It is also believed that LCST can be controlled in a wide range of temperature including body temperature since a variety of combinations of hydrophilic and hydrophobic groups are possible. Furthermore, such oligopeptides are well known to be biodegradable by lysosomal enzymes in the cell, which can contribute biodegradation of the polymer.

Accordingly, the present invention relates to poly(organophosphazenes) represented by the following Formula 1, in which poly(ethylene glycol) as hydrophilic group and various forms of oligopeptides having broader and stronger hydrophobicity than amino acids as hydrophobic group are successively introduced, and that exhibits various temperature-dependent sol-gel or sol-solid phase transition behaviors and biocompatibility, and to a preparation method thereof:

Formula 1 wherein R is a methyl or ethyl group;

R' is a group selected from the group consisting of COOR, $CH_2COOR$, $CH_2CH_2COOR$, $CH_2CH(CH_3)_2$, $CH_2C_6H_5$, $CH(CH_3)CH_2CH_3$ and $CH_3$;

R" is a group selected from the group consisting of $CH_2COOR$, $CH_2CH_2COOR$, $CH_2CH(CH_3)_2$, $CH_2C_6H_5$, $CH(CH_3)CH_2CH_3$ and $CH_3$;

R'" is a group selected from the group consisting of $CH_2COOR$, $CH_2CH_2COOR$ and H, wherein the R is the same as defined above;

n is the degree of polymerization of polyphosphazenes having a value of from 30 to 100;

x is the number of repeating unit of poly(ethylene glycol) selected from the integers of 3, 4, 7, 12 and 16;

y is the molar content of poly(ethylene glycol) of from 0.5 to 1.5;

a equals to 1; and b and c equal to 0 or 1.

A preparation method of poly(organophosphazenes) of Formula 1 is described below. According to the present invention, it is necessary to perform all the synthetic reactions in dry nitrogen or argon atmosphere using thoroughly dried reactants and solvents. First, hexachlorocyclotriphosphazene ($N_3P_3Cl_6$) represented by Formula 2 is thermally polymerized according to the literature method (Youn Soo Sohn et al., *Macromolecules*, 28, 7566 (1995)) to obtain a low molecular weight ($M_w = 10^{4-5}$) poly(dichlorophosphazene) represented by Formula 3.

Formula 2

Formula 3

Specifically, the cyclic phosphazene trimer, $N_3P_3Cl_6$, represented by Formula 2 purified by sublimation and 3-10% (w/w) aluminum chloride ($AlCl_3$) with respect to the purified trimer are placed in a glass reaction tube. After the tube is sealed, melt reaction is carried out by rotating the glass reaction tube at 10-20 rpm at 230-250° C. for 3-5 hours, to obtain poly(dichlorophosphazene) represented by Formula 3. In Formula 3, n represents a degree of polymerization between 30 and 100.

Subsequently, a methoxy poly(ethylene glycol) represented by Formula 4 or a salt thereof represented by Formula 5 is reacted with poly(dichlorophosphazene) of Formula 3 to introduce poly(ethylene glycol) to the polyphosphazene backbone.

Formula 4

Formula 5

In Formulae 4 and 5, x is the same as defined in Formula 1.

The sodium salt of poly(ethylene glycol) of Formula 5 is obtained by reacting poly(ethylene glycol) of Formula 4 with 1-1.5 equivalents of sodium metal or sodium hydride with respect to the poly(ethylene glycol). It is preferred to use poly(ethylene glycol) of Formula 4 after it is vacuum dried at 70-80° C. in an oil bath for 1-2 days. As a reaction solvent, tetrahydrofuran (THF), benzene or toluene is used.

The reaction between poly(ethylene glycol) of Formula 4 or the sodium salt thereof represented by Formula 5 with poly(dichlorophosphazene) of Formula 3 is carried out by adding the poly(ethylene glycol) of Formula 4 or the sodium salt of poly(ethylene glycol) of Formula 5 to a solution of poly(dichlorophosphazene) of Formula 3 at −60 to −78° C. for 30 to 50 minutes, and then the reaction mixture is further stirred for 15 to 20 hours at room temperature. Tetrahydrofuran, benzene or toluene is used as a reaction solvent. In particular, if poly(ethylene glycol) of Formula 4 is reacted with poly(dichlorophosphazene) of Formula 3, an excess amount, for example, at least 3 equivalents of triethylamine should be added. The mole ratio of the hydrophilic poly (ethylene glycol) and poly(dichlorophosphazene) can be adjusted within the range of 0.5 to 1.5 depending on the purpose. If the mole ratio of poly(ethylene glycol) is increased, the solubility of the final polymer product increases, and also its lower critical solution temperature increases. Therefore, it is required to select appropriate molar ratios depending on the types of oligopeptide esters to be subsequently introduced. When the mole ratio is out of the above-mentioned range, the solubility of the polymers may be lost or the lower critical solution temperature may not be exhibited.

Finally, the resultant product from the reaction of the compound of Formula 4 or 5 with the compound of Formula 3 is reacted with an oligopeptide ester of Formula 6 or its acid salt, to obtain the poly(organophosphazenes) represented by Formula 1 of the present invention.

Formula 6

In Formula 6, R, R', R", R''', a, b and c are identical to those as defined in Formula 1.

In this step, 1.0-1.5 equivalents of oligopeptide ester of Formula 6 or its acid salt per 1.0 equivalent of chlorine atom left in the intermediate product from the previous step are reacted with the intermediate product obtained from the previous step. The acid salt can be hydrochloride, oxalate or trifluoroacetate. The reaction is carried out in the presence of 3 to 6 equivalents of triethylamine using chloroform as a solvent by refluxing for 1 to 3 days.

Once the reaction is completed, the precipitate (NaCl or NEt$_3$.HCl) is removed by filtering the resulting reaction solution, and the filtrate is then concentrated under vacuum. The residue is dissolved in tetrahydrofuran, and then, an excessive amount of ethyl ether or hexane is added to induce precipitation, thereby removing the unreacted poly(ethylene glycol) and oligopeptide ester. This process is repeated 2 to 3 times. Subsequently, the precipitate obtained from this process is dissolved in a small amount of distilled water and then were dialyzed using a dialysis membrane (MW CO: 3500) for 1 to 2 days. After freeze-drying, the pure final product represented by Formula 1 is obtained.

The oligopeptides of Formula 6 can be synthesized by the literature method (John Jones, *Amino Acid and Peptide Synthesis*, Oxford University Press, 32-34, (1994)).

The above-described reaction process can be summarized into the following Reaction Scheme 1.

Reaction Scheme 1:

wherein R, R', R", R'", n, x, y, a, b and c are identical to those as defined in Formula 1.

EXAMPLES

The invention will be further illustrated by the following examples, but is not limited to the examples given.

Elemental analysis of carbon, hydrogen and nitrogen for the compounds of the present invention was performed by the Perkin-Elmer C, H N analyzer. Proton nuclear magnetic resonance ($^1$H NMR) spectra were obtained by Bruker DPX-250 NMR spectrometer, and phosphorus nuclear magnetic resonance (PMR) spectra were obtained by Varian Gemini-400 NMR spectrometer.

Example 1

Preparation of poly[(methoxy triethylene glycol) (glycylglutamic diethyl ester)phosphazene] [NP(MTrEG)$_{0.85}$(GlyGluEt$_2$)$_{1.25}$]$_n$ Methoxy triethylene glycol (1.41 g, 8.6 mmol) and sodium hydride (0.22 g, 9.0 mmol) were dispersed in dried tetrahydrofuran, and the resultant solution was stirred under argon atmosphere for 2 hours to obtain a solution of the sodium salt of methoxy triethylene glycol. Poly(dichlorophosphazene) (5% AlCl$_3$, 1.00 g, 8.6 mmol) was dissolved in dried tetrahydrofuran in a reaction flask and was moved into a dry ice-acetone bath, and to this solution was added the above-prepared solution of the sodium salt of methoxy triethylene glycol for 30 minutes. After 30 minutes, the dry ice-acetone bath was removed, and the reaction solution was further stirred at room temperature for 8 hours. To the reaction solution, a solution (100 ml) of triethylamine (6.26 g, 61.9 mmol) and oxalate of glycylglutamic diethyl ester (3.13 g, 5.15 mmol) in chloroform was added. The reaction mixture was stirred at room temperature for 12 hours and then further reacted at 50° C. for 48 hours. The reaction mixture was filtered to remove precipitates (Et$_3$N.HCl or NaCl), and the filtrate was concentrated under vacuum. Subsequently, the concentrate was dissolved in tetrahydrofuran, to which an excessive amount of ethyl ether or hexane was added to induce precipitation. This process was repeated twice. The resulting precipitate was dialyzed by using dialysis membrane (MWCO: 3500) in methanol and water successively each for 18 hours, and then freeze-dried to obtain the final polymer product, [NP{(OCH$_2$CH$_2$)$_3$OCH$_3$}$_{0.85}$ {NHCH$_2$CONHCH(CH$_2$CH$_2$COOCH$_2$CH$_3$)COOCH$_2$CH$_3$}$_{1.25}$]$_n$, with an yield of 50%.

Empirical formula: C$_{20}$H$_{41}$N$_4$O$_{12}$P

Elemental Analysis

Found: C, (43.89), H, (8.31), N, (10.03). Calculated: C, (43.51), H, (7.52), N, (9.66).

$^1$H NMR spectral data (DMSO, ppm):

δ   1.1-1.2(m,   7.0H)   (—NHCH$_2$CONHCH(CH$_2$CH$_2$COOCH$_2$CH$_3$)COOCH$_2$CH$_3$)

δ   1.8-2.1   (m,   2.0H)   (—NHCH$_2$CONHCH(CH$_2$CH$_2$COOCH$_2$CH$_3$)COOCH$_2$CH$_3$)

δ   2.3-2.5(t,   1.8H)   (—NHCH$_2$CONHCH(CH$_2$CH$_2$COOCH$_2$CH$_3$)COOCH$_2$CH$_3$)

δ 3.2-3.3(s, 3.0H) (—OCH$_2$CH$_2$O(CH$_2$CH$_2$O)$_2$CH$_3$)

δ   3.3-3.7(b,   13.8H)   (—OCH$_2$CH$_2$O(CH$_2$CH$_2$O)$_2$CH$_3$, —NHCH$_2$CONHCH(CH$_2$CH$_2$COOCH$_2$CH$_3$)COOCH$_2$CH$_3$)

δ   3.9-4.2(b,   5.4H)   (—NHCH$_2$CONHCH(CH$_2$CH$_2$COOCH$_2$CH$_3$)COOCH$_2$CH$_3$, —OCH$_2$CH$_2$O(CH$_2$CH$_2$O)$_2$CH$_3$)

δ   4.2-4.4(b,   1.0H)(—NHCH$_2$CONHCH(CH$_2$CH$_2$COOCH$_2$CH$_3$)COOCH$_2$CH$_3$)

$^{31}$P NMR spectral data (DMSO, ppm): δ 2.25

Mean molecular weight: (Mw, Eluent: 0.1% (w/v) tetrabutylammonium bromide in tetrahydrofuran): 73,000

Lower critical solution temperature: 25° C.

Example 2

Preparation of poly[(methoxy tetraethylene glycol) (glycylglutamic diethyl ester)phosphazene], [NP(TeEG)$_{0.95}$(GlyGluEt$_2$)$_{1.05}$]$_n$ By using methoxy tetraethylene glycol (1.79 g, 8.6 mmol), sodium hydride (0.22 g, 9.03 mmol), poly(dichlorophosphazene) (3% AlCl$_3$, 1.00 g, 8.6 mmol), triethylamine (6.3 g, 62.4 mmol) and oxalate of glycylglutamic diethyl ester (3.2 g, 5.2 mmol), a poly(organophosphazene), [NP{(OCH$_2$CH$_2$)$_4$OCH$_3$}$_{0.95}${NHCH$_2$CONHCH(CH$_2$CH$_2$COOCH$_2$CH$_3$) COOCH$_2$CH$_3$}$_{1.05}$]$_n$, was obtained by the same method as described in Example 1 with an yield of 36%.

Empirical formula: C$_{20}$H$_{40}$N$_3$O$_{18}$P

Elemental Analysis

Found: C, (45.09), H, (8.46), N, (8.60). Calculated: C, (45.37), H, (6.00), N, (8.16).

$^1$H NMR spectral data (DMSO, ppm):

δ   1.1-1.3(m,   5.7H)   (—NHCH$_2$CONHCH(CH$_2$CH$_2$COOCH$_2$CH$_3$)COOCH$_2$CH$_3$)

δ   1.8-2.1   (m,   1.8H)   (—NHCH$_2$CONHCH(CH$_2$CH$_2$COOCH$_2$CH$_3$)COOCH$_2$CH$_3$)

δ   2.2-2.4(t,   1.6H)   (—NHCH$_2$CONHCH(CH$_2$CH$_2$COOCH$_2$CH$_3$)COOCH$_2$CH$_3$)

δ 3.2-3.3(s, 3.0H) (—OCH$_2$CH$_2$O(CH$_2$CH$_2$O)$_3$CH$_3$)

δ   3.3-3.8   (b,   13.7H)   (—OCH$_2$CH$_2$O(CH$_2$CH$_2$O)$_3$CH$_3$, —NHCH$_2$CONHCH(CH$_2$CH$_2$COOCH$_2$CH$_3$)COOCH$_2$CH$_3$)

δ   3.8-4.2(b,   4.4H)   (—NHCH$_2$CONHCH(CH$_2$CH$_2$COOCH$_2$CH$_3$)COOCH$_2$CH$_3$, —OCH$_2$CH$_2$O(CH$_2$CH$_2$O)$_3$CH$_3$)

δ   4.2-4.4(b,   1.01H)   (—NHCH$_2$CONHCH(CH$_2$CH$_2$COOCH$_2$CH$_3$)COOCH$_2$CH$_3$)

$^{31}$P NMR spectral data (CDCl$_3$, ppm): δ 0.349

Mean molecular weight (Mw, Eluent: 0.1% (w/v) tetrabutylammonium bromide in tetrahydrofuran): 150,000

Lower critical solution temperature: 27° C.

Example 3

Preparation of poly[(methoxy poly(ethylene glycol) 350)(glycylglutamic diethyl ester)phosphazene], [NP(MPEG350)$_{1.05}$(GlyGluEt$_2$)$_{0.95}$]$_n$ Methoxy poly(ethylene glycol) with a molecular weight of 350 (MPEG350) (6.34 g, 18.1 mmol) and a piece of sodium (0.46 g, 19.9 mmol) were dispersed in dried tetrahydrofuran, which was refluxed for 24 hours under argon atmosphere to obtain the sodium salt of MPEG350. Poly(dichlorophosphazene) (5% AlCl$_3$, 2.00 g, 17.2 mmol) dissolved in dried tetrahydrofuran in a reaction flask was placed in a dry ice-acetone bath (−78° C.), and to this solution was added the above solution of the sodium salt of MPEG350 for 30 minutes. After 30 minutes, the dry ice-acetone bath was removed, and the reaction was continued for 8 hours at room temperature. To the reaction solution was added a solution (100 ml) of triethylamine (14.8 g, 147 mmol) and oxalate of glycylglutamic diethyl ester (7.6 g, 12.25 mmol), and then the reaction mixture was stirred at room temperature for 12 hours, followed by further reaction at 70° C. for another 24 to 48 hours. The reaction mixture was filtered to remove excessive amount of precipitate produced (Et$_3$N.HCl or NaCl), and then the filtrate was concentrated under vacuum. The concentrate was then dissolved in tetrahydrofuran, to which an excessive amount of ether or hexane was added to promote precipitation. This process was repeated twice. The resulting precipitate was dissolved in a small amount of water (100 ml), which was dialyzed using dialysis membrane (MWCO: 3500) for 18 hours and then freeze-dried to obtain the final poly(organophosphazene), [NP{(OCH$_2$CH$_2$)$_7$OCH$_3$}$_{1.05}$ {NHCH$_2$CONHCH(CH$_2$CH$_2$COOCH$_2$CH$_3$) COOCH$_2$CH$_3$}$_{0.95}$]$_n$, with an yield of 77%.

Empirical formula: C$_{26}$H$_{55}$N$_3$O$_{14}$P

Elemental Analysis

Found: C, (47.49), H, (7.78), N, (5.73). Calculated: C, (45.91), H, (7.83), N, (5.93).

$^1$H NMR spectral data:

δ  1.1-1.3(m, 6.0H) (—NHCH$_2$CONHCH (CH$_2$CH$_2$COOCH$_2$CH$_3$)COOCH$_2$CH$_3$)

δ  1.9-2.2(m, 2.0H) (—NHCH$_2$CONHCH(C H$_2$CH$_2$COOCH$_2$CH$_3$)COOCH$_2$CH$_3$)

δ  2.4-2.6(t, 2.0H) (—NHCH$_2$CONHCH(CH$_2$C H$_2$COOCH$_2$CH$_3$)COOCH$_2$CH$_3$)

δ 3.3-3.4(s, 3.0H) (—OCH$_2$CH$_2$O(CH$_2$CH$_2$O)$_6$CH$_3$)

δ  3.4-3.7(b, 28.0H) (—OCH$_2$CH$_2$O(CH$_2$CH$_2$O)$_6$CH$_3$, —NHC H$_2$CONHCH(CH$_2$CH$_2$COOCH$_2$CH$_3$)COOCH$_2$CH$_3$)

δ  3.9-4.2(b, 6.0H) (—NHCH$_2$CONHCH(CH$_2$CH$_2$COOC H$_2$CH$_3$)COOCH$_2$CH$_3$, —OCH$_2$CH$_2$O(CH$_2$CH$_2$O)$_6$CH$_3$)

δ  4.2-4.4(b, 1.0H) (—NHCH$_2$CONHC H(CH$_2$CH$_2$COOCH$_2$CH$_3$)COOCH$_2$CH$_3$)

$^{31}$P NMR spectral data (D$_2$O, ppm): δ 1.4

Mean molecular weight (Mw, Eluent: 0.1M sodium nitrate in water:acetonitrile=4:1): 18,000

Lower critical solution temperature: 81° C.

Example 4

Preparation of poly[(methoxy poly(ethylene glycol) 350)(glycylaspartic diethyl ester)phosphazene], [NP (MPEG350)$_{1.1}$(GlyAspEt$_2$)$_{0.9}$]$_n$ By using MPEG350 (6.62 g, 18.9 mmol), a piece of sodium metal (0.48 g, 20.8 mmol), poly(dichlorophosphazene) (5% AlCl$_3$, 2.00 g, 17.2 mmol), triethylamine (14.1 g, 139.4 mmol) and oxalate of glycylaspartic diethyl ester (6.7 g, 11.61 mmol), [NP{(OCH$_2$CH$_2$)$_7$OCH$_3$}$_{1.1}${NH CH$_2$CONHCH(CH$_2$COOCH$_2$CH$_3$)COOCH$_2$CH$_3$}$_{0.9}$]$_n$, was obtained by the same method as described in Example 3 with an yield of 71%.

Empirical formula: C$_{25}$H$_{50}$N$_3$O$_{12}$P

Elemental Analysis

Found: C, (47.20), H, (7.89), N, (5.90). Calculated: C, (47.10), H, (7.60), N, (6.03).

$^1$H NMR spectral data (D$_2$O, ppm):

δ  1.0-1.2(m, 5.4H) (—NHCH$_2$CONHCH(CH$_2$COOCH$_2$C H$_3$)COOCH$_2$CH$_3$)

δ  2.6-2.8(m, 1.8H) (—NHCH$_2$CONHCH(C H$_2$COOCH$_2$CH$_3$)COOCH$_2$CH$_3$)

δ 3.2-3.3(s, 3.3H) (—OCH$_2$CH$_2$O(CH$_2$CH$_2$O)$_6$CH$_3$)

δ  3.4-3.7(b, 30.4H) (—OCH$_2$CH$_2$O(CH$_2$CH$_2$O)$_6$CH$_3$, —NHCH$_2$CONHCH(CH$_2$COOCH$_2$CH$_3$)COOCH$_2$CH$_3$)

δ  3.9-4.1 (b, 5.8H) (—NHCH$_2$CONHCH(CH$_2$COOC H$_2$CH$_3$)COOCH$_2$CH$_3$, —OCH$_2$CH$_2$O(CH$_2$CH$_2$O)$_6$CH$_3$)

δ  4.2-4.3(b, 0.9H) (—NHCH$_2$CONHC H(CH$_2$COOCH$_2$CH$_3$)COOCH$_2$CH$_3$)

$^{31}$P NMR spectral data (D$_2$O, ppm): δ 0.9

Mean molecular weight (Mw, Eluent: 0.1M sodium nitrate in water:acetonitrile=4:1): 36,000

Lower critical solution temperature: 89° C.

Example 5

Preparation of poly[(methoxy poly(ethylene glycol) 350)(glycylleucine ethyl ester) phosphazene], [NP (MPEG350)$_{0.92}$(GlyLeu Et)$_{1.08}$]$_n$ By using MPEG350 (5.53 g, 15.8 mmol), a piece of sodium metal (0.4 g, 17.4 mmol), poly(dichlorophosphazene) (5% AlCl$_3$, 2.00 g, 17.2 mmol), triethylamine (16.92 g, 167.2 mmol) and trifluoroacetate of glycylleucine ethyl ester (9.2 g, 27.9 mmol), [NP{(OCH$_2$CH$_2$)$_7$OCH$_3$}$_{0.92}$ {NHCH$_2$CONHCH(CH$_2$CH(CH$_3$)$_2$)COOCH$_2$CH$_3$}$_{1.08}$]$_n$, was obtained by the same method as described in Example 3 with an yield of 82%.

Empirical formula: C$_{24}$H$_{50}$N$_3$O$_{10}$P

Elemental Analysis

Found: C, (49.06), H, (8.38), N, (7.43). Calculated: C, (49.32), H, (8.19), N, (7.39).

$^1$H NMR spectral data (D$_2$O, ppm):

δ  0.7-0.9(m, 5.4H) (—NHCH$_2$CONHCH(CH$_2$CH(C H$_3$)$_2$)COOCH$_2$CH$_3$)

δ  1.0-1.3(m, 2.8H) (—NHCH$_2$CONHCH(CH$_2$CH(CH$_3$)$_2$) COOCH$_2$CH$_3$)

δ  1.4-1.7(t, 2.8H) (—NHCH$_2$CONHCH(CH$_2$C H(CH$_3$)$_2$)COOCH$_2$CH$_3$)

δ 3.2-3.3(s, 2.7H) (—OCH$_2$CH$_2$O(CH$_2$CH$_2$O)$_6$CH$_3$)

δ  3.5-3.8(b, 26.1H) (—OCH$_2$CH$_2$O(CH$_2$CH$_2$O)$_6$CH$_3$, —NHCH$_2$CONHCH(CH$_2$CH(CH$_3$)$_2$)COOCH$_2$CH$_3$)

δ  3.9-4.2(b, 3.6H) (—NHCH$_2$CONHCH(CH$_2$CH(CH$_3$)$_2$) COOCH$_2$CH$_3$, —OCH$_2$CH$_2$O(CH$_2$CH$_2$O)$_6$CH$_3$)

δ  4.2-4.3(b, 0.9H) (—NHCH$_2$CONHC H(CH$_2$CH(CH$_3$)$_2$)COOCH$_2$CH$_3$)

$^{31}$P NMR spectral data (D$_2$O, ppm): δ 3.8

Mean molecular weight (Mw, Eluent: 0.1M sodium nitrate in water:acetonitrile=4:1): 36,000

Lower critical solution temperature: 65° C.

Example 6

Preparation of poly[(methoxy poly(ethylene glycol) 350)(glycylphenylalanine ethyl ester)phosphazene], [NP(MPEG350)$_{0.78}$(GlyPhe(Et)$_{1.22}$)]$_n$ By using MPEG350 (3.01 g, 8.6 mmol), sodium hydride (0.22 g, 9.03 mmol), poly(dichlorophosphazene) (3% AlCl$_3$, 1.00 g, 8.6 mmol), triethylamine (6.3 g, 61.9 mmol) and glycylphenylalanine ethyl ester hydrogen chloride (2.96 g, 10.32 mmol), [NP{(OCH$_2$CH$_2$)$_7$OCH$_3$}$_{0.78}$ {NHCH$_2$CONHCH(CH$_2$C$_6$H$_5$)COOCH$_2$CH$_3$}$_{1.22}$]$_n$ was obtained the same method as described in Example 1 with an yield of 42%.

Empirical formula: C$_{27}$H$_{46}$N$_3$O$_{11}$P
Elemental Analysis
Found: C, (50.77), H, (7.11), N, (6.43). Calculated: C, (49.38), H, (7.09), N, (7.10).
$^1$H NMR spectral data (DMSO, ppm):
δ  0.7-1.2(b, 1.9H) (—NHCH$_2$CONHCH(CH$_2$C$_6$H$_5$)COOCH$_2$CH$_3$)
δ  2.9-3.2(b, 1.2H) (—NHCH$_2$CONHCH(CH$_2$C$_6$H$_5$)COOCH$_2$CH$_3$)
δ 3.2-3.3(s, 3.0H) (—OCH$_2$CH$_2$O(CH$_2$CH$_2$O)$_6$CH$_3$)
δ  3.3-3.7(b, 25.4H) (—NHCH$_2$CONHCH(CH$_2$C$_6$H$_5$)COOCH$_2$CH$_3$, —OCH$_2$CH$_2$O(CH$_2$CH$_2$)$_6$CH$_3$)
δ 3.7-4.1(b, 2.9H) (—NHCH$_2$CONHCH(CH$_2$C$_6$H$_5$)COOCH$_2$CH$_3$, —OCH$_2$CH$_2$O(CH$_2$CH$_2$O)$_6$CH$_3$)
δ  4.4-4.6(b, 0.7H) (—NHCH$_2$CONHCH(CH$_2$C$_6$H$_5$)COOCH$_2$CH$_3$)
δ  7.0-7.3(b, 2.8H) (—NHCH$_2$CONHCH(CH$_2$C$_6$H$_5$)COOCH$_2$CH$_3$)
$^{31}$P NMR spectral data (CDCl$_3$, ppm): δ 0.23
Mean molecular weight (Mw, Eluent: 0.1% (w/v) tetrabutylammonium bromide in tetrahydrofuran): 140,000
Lower critical solution temperature: 70° C.

Example 7

Preparation of poly[(methoxy poly(ethylene glycol) 550)(glycylglutamic dimethyl ester)phosphazene], [NP(MPEG550)$_{1.10}$(GlyGlu(Me$_2$)$_{0.90}$)]$_n$ By using methoxy poly(ethylene glycol) with a molecular weight of 550 (MPEG550) (10.4 g, 18.92 mmol), a piece of sodium metal (0.48 g, 20.8 mmol), poly(dichlorophosphazene) (5% AlCl$_3$, 2.00 g, 17.2 mmol), triethylamine (14.1 g, 139.4 mmol), and oxalate of glycylglutamic dimethyl ester (7.1 g, 11.6 mmol), [NP{(OCH$_2$CH$_2$)$_{12}$OCH$_3$}$_{1.1}$ {NHCH$_2$CONHCH(CH$_2$CH$_2$COOCH$_2$CH$_3$) COOCH$_3$}$_{0.90}$]$_n$ was obtained by the same method as described in Example 3 with an yield of 79%.

Empirical formula: C$_{35}$H$_{70}$N$_3$O$_{17}$P
Elemental Analysis
Found: C, (50.68), H, (8.43), N, (4.63). Calculated: C, (50.29), H, (8.44), N, (4.94).
$^1$H NMR spectral data (D$_2$O, ppm):
δ  1.7-2.2(m, 1.8H) (—NHCH$_2$CONHCH(CH$_2$CH$_2$COOCH$_3$)COOCH$_3$)
δ  2.3-2.5(t, 1.8H) (—NHCH$_2$CONHCH(CH$_2$CH$_2$COOCH$_3$)COOCH$_3$)
δ 3.3-3.4(s, 3.3H) (—OCH$_2$CH$_2$O(CH$_2$CH$_2$O)$_{11}$CH$_3$)
δ 3.5-3.8(b, 52.4H) (—OCH$_2$CH$_2$O(CH$_2$CH$_2$O)$_{11}$CH$_3$,
δ  3.9-4.1(b, 5.8H) (—NHCH$_2$CONHCH(CH$_2$CH$_2$COOCH$_3$)COOCH$_3$, —OCH$_2$CH$_2$O(CH$_2$CH$_2$O)$_{11}$CH$_3$)
δ  4.2-4.4(b, 0.9H) (—NHCH$_2$CONHCH(CH$_2$CH$_2$COOCH$_3$)COOCH$_3$)
$^{31}$P NMR spectral data (D$_2$O, ppm): δ 0.9
Mean molecular weight (Mw, Eluent: 0.1M sodium nitrate in water:acetonitrile=4:1): 62,000
Lower critical solution temperature: 98° C.

Example 8

Preparation of poly[(methoxy poly(ethylene glycol) 750)(glycylglutamic diethyl ester)phosphazene], [NP(MPEG750)$_{0.8}$(GlyGluEt$_2$)$_{1.2}$]$_n$ By using methoxy poly(ethylene glycol) with a molecular weight of 750 (MPEG750) (15.48 g, 20.64 mmol), a piece of sodium metal (0.52 g, 22.7 mmol), poly(dichlorophosphazene) (5% AlCl$_3$, 2.00 g, 17.2 mmol), triethylamine (18.8 g, 185.8 mmol) and oxalate of glycylglutamic diethyl ester (12.5 g, 20.5 mmol), [NP{(OCH$_2$CH$_2$)$_{16}$OCH$_3$}$_{0.8}$ {NHCH$_2$CONHCH(CH$_2$CH$_2$COOCH$_2$CH$_3$) COOCH$_2$CH$_3$}$_{1.2}$]$_n$, was obtained by the same method as described in Example 3 with an yield of 80%.

Empirical formula: C$_{39}$H$_{77}$N$_3$O$_{17}$P
Elemental Analysis
Found: C, (49.75), H, (8.00), N, (5.00). Calculated: C, (49.74), H, (8.00), N, (4.98).
$^1$H NMR spectral data (D$_2$O, ppm):
δ  1.0-1.2(m, 7.2H) (—NHCH$_2$CONHCH(CH$_2$CH$_2$COOCH$_2$CH$_3$)COOCH$_2$CH$_3$)
δ  1.8-2.1(m, 2.8H) (—NHCH$_2$CONHCH(CH$_2$CH$_2$COOCH$_2$CH$_3$)COOCH$_2$CH$_3$)
δ  2.3-2.5(t, 2.4H) (—NHCH$_2$CONHCH(CH$_2$CH$_2$COOCH$_2$CH$_3$)COOCH$_2$CH$_3$)
δ 3.2-3.3(s, 2.4H) (—OCH$_2$CH$_2$O(CH$_2$CH$_2$O)$_{15}$CH$_3$)
δ  3.4-3.7(b, 52.0H) (—OCH$_2$CH$_2$O(CH$_2$CH$_2$O)$_{15}$CH$_3$, —NHCH$_2$CONHCH(CH$_2$CH$_2$COOCH$_2$CH$_3$)COOCH$_2$CH$_3$)
δ  3.9-4.1(b, 6.4H) (—NHCH$_2$CONHCH(CH$_2$CH$_2$COOCH$_2$CH$_3$)COOCH$_2$CH$_3$, —OCH$_2$CH$_2$O(CH$_2$CH$_2$O)$_{15}$CH$_3$)
δ  4.2-4.4(b, 1.2H) (—NHCH$_2$CONHCH(CH$_2$CH$_2$COOCH$_2$CH$_3$)COOCH$_2$CH$_3$)
$^{31}$P NMR spectral data (D$_2$O, ppm): δ 0.8
Mean molecular weight (Mw, Eluent: 0.1M sodium nitrate in water:acetonitrile=4:1): 35,000
Lower critical solution temperature: 90° C.

Example 9

Preparation of poly[(methoxy poly(ethylene glycol) 350)(glycylphenylalanylleucine ethyl ester)phosphazene], [NP(MPEG350)$_{1.02}$(GlyPheLeu(Et)$_{0.98}$)]$_n$ By using MPEG350 (3.01 g, 8.6 mmol), sodium hydride (0.22 g, 9.03 mmol), poly(dichlorophosphazene) (3% AlCl$_3$, 1.00 g, 8.6 mmol), triethylamine (6.3 g, 61.9 mmol) and glycylphenylalanylleucine ethyl ester (3.75 g, 10.32 mmol), [NP{(OCH$_2$CH$_2$)$_7$OCH$_3$}$_{1.02}${NHCH$_2$CON HCH (CH$_2$C$_6$H$_5$)NHCH(CH$_2$CH(CH$_3$)$_2$)COOCH$_2$CH$_3$}$_{0.98}$]$_n$, was obtained by the same method as described in Example 1 with an yield of 50%.

Empirical formula: C$_{36}$H$_{69}$N$_5$O$_{15}$P
Elemental Analysis
Found: C, (52.31), H, (8.71), N, (8.42). Calculated: C, (52.54), H, (7.90), N, (8.29).
$^1$H NMR spectral data (CDCl$_3$, ppm):
δ 0.7-1.0(b, 5.8H) (—NHCH$_2$CONHCH(CH$_2$C$_6$H$_5$)NHCH(CH$_2$CH(CH$_3$)$_2$)COOCH$_2$CH$_3$)
δ 1.1-1.4(b, 3.9H)(—NHCH$_2$CONHCH(CH$_2$C$_6$H$_5$)NHCH(CH$_2$CH(CH$_3$)$_2$)COOCH$_2$CH$_3$)

δ 1.4-1.8(b, 2.6H)(—NHCH$_2$CONHCH(CH$_2$C$_6$H$_5$)NHCH(C$\underline{H}_2$C$\underline{H}$(CH$_3$)$_2$)COOCH$_2$CH$_3$)

δ 2.9-3.2(b, 1.6H)(—NHCH$_2$CONHCH(C$\underline{H}_2$C$_6$H$_5$)NHCH(CH$_2$CH(CH$_3$)$_2$)COOCH$_2$CH$_3$)

δ 3.2-3.3(s, 3.0H)(—OCH$_2$CH$_2$O(CH$_2$CH$_2$O)$_6$C$\underline{H}_3$)

δ 3.5-3.9(b, 23.3H)(—OCH$_2$CH$_2$O(C$\underline{H}_2$C$\underline{H}_2$O)$_6$CH$_3$)

δ 3.9-4.3(b, 4.7H)(—OC$\underline{H}_2$CH$_2$O(CH$_2$CH$_2$O)$_6$CH$_3$, —NHC$\underline{H}_2$CONHCH(C$\underline{H}_2$C$_6$H$_5$)NHCH(CH$_2$CH(CH$_3$)$_2$)COOCH$_2$CH$_3$)

δ 4.3-4.7(b, 1.7H)(—OC$\underline{H}_2$CH$_2$O(CH$_2$CH$_2$O)$_6$CH$_3$, —NHCH$_2$CONHCH(C$\underline{H}_2$C$_6$H$_5$)NHCH(CH$_2$CH(CH$_3$)$_2$)COOCH$_2$CH$_3$)

δ 7.0-7.4(b, 5.2H)(—N$\underline{H}$CH$_2$CON$\underline{H}$CH(CH$_2$C$_6$$\underline{H}_5$)N$\underline{H}$CH(CH$_2$CH(CH$_3$)$_2$)COOCH$_2$CH$_3$)

$^{31}$P NMR spectral data (CDCl$_3$, ppm): δ 0.72

Mean molecular weight (Mw, Eluent: 0.1% (w/v) tetrabutylammonium bromide in tetrahydrofuran): 110,000

Gelation temperature: 25° C.

Example 10

Preparation of poly[(methoxy poly(ethylene glycol) 350)(glycylleucylphenylalanine ethyl ester)phosphazene], [NP(MPEG350)$_{0.84}$(GlyLeuPheEt)$_{1.16}$]$_n$ By using MPEG350 (3.01 g, 8.6 mmol), sodium hydride (0.22 g, 9.03 mmol), poly(dichlorophosphazene) (3% AlCl$_3$, 1.00 g, 8.6 mmol), triethylamine (6.3 g, 61.9 mmol) and glycylleucylphenylalanine ethyl ester (3.71 g, 10.32 mmol), [NP{OCH$_2$CH$_2$}$_7$OCH$_3$]$_{0.84}${NHCH$_2$CONHCH(CH$_2$CH(CH$_3$)$_2$)NHCH(CH$_2$C$_6$H$_5$)COOCH$_2$CH$_3$}$_{1.16}$]$_n$, was obtained by the same method as described in Example 1 with an yield of 43%.

Empirical formula: C$_{34}$H$_{63}$N$_4$O$_{13}$P
Elemental Analysis
Found: C, (51.93), H, (7.52), N, (8.14). Calculated: C, (52.90), H, (7.53), N, (7.89).

$^1$H NMR spectral data (DMSO, ppm):

δ 0.7-1.0(b, 3.8H) (—NHCH$_2$CONHCH(CH$_2$CH(C$\underline{H}_3$)$_2$)NHCH(CH$_2$C$_6$H$_5$)COOCH$_2$CH$_3$)

δ 1.0-1.3(b, 3.6H) (—NHCH$_2$CONHCH(CH$_2$CH(CH$_3$)$_2$)NHCH(CH$_2$C$_6$H$_5$)COOCH$_2$C$\underline{H}_3$)

δ 1.3-1.8(b, 1.6H) (—NHCH$_2$CONHCH(CH$_2$C$\underline{H}$(CH$_3$)$_2$)NHCH(CH$_2$C$_6$H$_5$)COOCH$_2$CH$_3$)

δ 2.8-3.1 (b, 1.1H) (—NHCH$_2$CONHCH(CH$_2$CH(CH$_3$)$_2$)NHCH(C$\underline{H}_2$C$_6$H$_5$)COOCH$_2$CH$_3$)

δ 3.1-3.2(s, 3.0H) (—OCH$_2$CH$_2$O(CH$_2$CH$_2$O)$_6$C$\underline{H}_3$)

δ 3.2-3.8(b, 23.0H) (—OCH$_2$C$\underline{H}_2$O(C$\underline{H}_2$C$\underline{H}_2$O)$_6$CH$_3$)

δ 3.8-4.3(b, 3.9H) (—OC$\underline{H}_2$CH$_2$O(CH$_2$CH$_2$O)$_6$CH$_3$, —NHC$\underline{H}_2$CONHCH(CH$_2$CH(CH$_3$)$_2$)NHCH(CH$_2$C$_6$H$_5$)COOC$\underline{H}_2$CH$_3$)

δ 4.3-4.8(b, 1.7H) (—OC$\underline{H}_2$CH$_2$O(CH$_2$CH$_2$O)$_6$CH$_3$, —NHCH$_2$CONHCH(CH$_2$CH(C$\underline{H}_3$)$_2$)NHC$\underline{H}$(CH$_2$C$_6$H$_5$)COOCH$_2$CH$_3$)

δ 7.1-7.4(b, 4.2H)(—N$\underline{H}$CH$_2$CON$\underline{H}$CH(CH$_2$CH(CH$_3$)$_2$)N$\underline{H}$CH(CH$_2$C$_6$$\underline{H}_5$)COOCH$_2$CH$_3$)

$^{31}$P NMR spectral data (DMSO, ppm): δ 4.96

Mean molecular weight (Mw, Eluent: 0.1% (w/v) tetrabutylammonium bromide in tetrahydrofuran): 110,000

Gelation temperature: 28° C.

Example 11

Preparation of poly[(methoxy poly(ethylene glycol) 350) (glycylleucylphenylalanine ethyl ester)phosphazene], [NP(MPEG350)$_{0.7}$(GlyLeuPheEt)$_{1.3}$]$_n$ By using MPEG350 (3.01 g, 8.6 mmol), sodium hydride (0.22 g, 9.03 mmol), poly(dichlorophosphazene) (3% AlCl$_3$, 1.00 g, 8.6 mmol), triethylamine (6.3 g, 61.9 mmol) and glycylleucylphenylalanine ethyl ester (3.71 g, 10.32 mmol), [NP{(OCH$_2$CH$_2$)$_7$OCH$_3$}$_{0.7}${NHCH$_2$CONHCH(CH$_2$CH(CH$_3$)$_2$)NHCH(CH$_2$C$_6$H$_5$)COOCH$_2$—CH$_3$}$_{1.3}$]$_n$, was obtained by the same method as described in Example 1 with an yield of 74%.

Empirical formula: C$_{35}$H$_{63}$N$_5$O$_{13}$P
Elemental Analysis
Found: C, (52.15), H, (7.57), N, (8.70). Calculated: C, (52.60), H, (8.07), N, (8.47).

$^1$H NMR spectral data (DMSO, ppm):

δ 0.7-1.1 (b, 5.2H) (—NHCH$_2$CONHCH(CH$_2$CH(C$\underline{H}_3$)$_2$)NHCH(CH$_2$C$_6$H$_5$)COOCH$_2$CH$_3$)

δ 1.1-1.4(b, 4.3H) (—NHCH$_2$CONHCH(CH$_2$CH(CH$_3$)$_2$)NHCH(CH$_2$C$_6$H$_5$)COOCH$_2$CH$_3$)

δ 1.4-1.8(b, 3.2H) (—NHCH$_2$CONHCH(CH$_2$C$\underline{H}$(CH$_3$)$_2$)NHCH(CH$_2$C$_6$H$_5$)COOCH$_2$CH$_3$)

δ 2.9-3.2(b, 1.8H) (—NHCH$_2$CONHCH(CH$_2$CH(CH$_3$)$_2$)NHCH(C$\underline{H}_2$C$_6$H$_5$)COOCH$_2$CH$_3$)

δ 3.2-3.3(s, 3.0H) (—OCH$_2$CH$_2$O(CH$_2$CH$_2$O)$_6$C$\underline{H}_3$)

δ 3.3-4.0(b, 25.8H) (—OCH$_2$C$\underline{H}_2$O(C$\underline{H}_2$C$\underline{H}_2$O)$_6$CH$_3$)

δ 4.0-4.4(b, 6.2H) (—OC$\underline{H}_2$CH$_2$O(CH$_2$CH$_2$O)$_6$CH$_3$, —NHCH$_2$CONHC$\underline{H}$(CH$_2$C$\underline{H}$(CH$_3$)$_2$)NHCH(CH$_2$C$_6$H$_5$)COOC$\underline{H}_2$CH$_3$)

δ 4.4-4.7(b, 3.7H) (—OCH$_2$CH$_2$O(CH$_2$C$\underline{H}_2$O)$_6$CH$_3$, —NHCH$_2$CONHCH(CH$_2$CH(C$\underline{H}_3$)$_2$)NHC$\underline{H}$(CH$_2$C$_6$H$_5$)COOCH$_2$CH$_3$)

δ 7.1-7.4(b, 5.0H) (—N$\underline{H}$CH$_2$CON$\underline{H}$CH(CH$_2$CH(CH$_3$)$_2$)N$\underline{H}$CH(CH$_2$C$_6$$\underline{H}_5$)COOCH$_2$CH$_3$)

$^{31}$P NMR spectral data (CDCl$_3$, ppm): 0.926

Mean molecular weight (Mw, Eluent: 0.1% (w/v) tetrabutylammonium bromide in tetrahydrofuran): 120,000

Gelation Temperature: 5° C.

Example 12

Preparation of poly[(methoxy poly(ethylene glycol) 350)(glycylphenylalanyl-isoleucine ethyl ester)phosphazene], [NP(MPEG350)$_{1.0}$(GlyPhelleEt)$_{1.0}$]$_n$ By using MPEG350 (3.01 g, 8.6 mmol), sodium hydride (0.22 g, 9.03 mmol), poly(dichlorophosphazene) (8% AlCl$_3$, 1.00 g, 8.6 mmol), triethylamine (6.3 g, 61.9 mmol) and glycylphenylalanylisoleucine ethyl ester (3.71 g, 10.32 mmol), [NP{(OCH$_2$CH$_2$)$_7$OCH$_3$}$_{1.0}${NHCH$_2$CONHCH(CH$_2$C$_6$H$_5$)NHCH(CH(CH$_3$)CH$_2$(CH$_3$))COOCH$_2$CH$_3$}$_{1.0}$]$_n$, was obtained by the same method as described in Example 1 with an yield of 57%.

Empirical formula: C$_{34}$H$_{64}$N$_4$O$_{14}$P
Elemental Analysis
Found: C, (52.186), H, (8.159), N, (7.669). Calculated: C, (52.24), H, (8.15), N, (7.07).

$^1$H NMR spectral data (CDCl$_3$, ppm):

δ 0.4-1.0(b, 4.4H) (—NHCH$_2$CONHCH(CH$_2$C$_6$H$_5$)NHCH(CH(C$\underline{H}_3$)CH$_2$(C$\underline{H}_3$)) COOCH$_2$CH$_3$)

δ 1.0-1.2(b, 3.3H)(—NHCH$_2$CONHCH(CH$_2$C$_6$H$_5$)NHCH(CH(CH$_3$)CH$_2$(CH$_3$))COOCH$_2$C$\underline{H}_3$)

δ 1.2-1.4(b, 0.7H)(—NHCH$_2$CONHCH(CH$_2$C$_6$H$_5$)NHCH(CH(CH$_3$)CH$_2$(CH$_3$))COOCH$_2$CH$_3$)

δ 1.6-1.9(b, 0.8H)(—NHCH$_2$CONHCH(CH$_2$C$_6$H$_5$)NHCH(CH(CH$_3$)CH$_2$(CH$_3$))COOCH$_2$CH$_3$)

δ 2.9-3.1(b, 4.8H)(—NHCH$_2$CONHCH(CH$_2$C$_6$H$_5$)NHCH(CH(CH$_3$)CH$_2$(CH$_3$))COOCH$_2$CH$_3$)

δ 3.2-3.3(s, 3.0H) (—OCH$_2$CH$_2$O(CH$_2$CH$_2$O)$_6$CH$_3$)

δ 3.3-3.7(b, 19.0H) (—OCH$_2$CH$_2$O(CH$_2$CH$_2$O)$_6$CH$_3$)

δ 3.7-4.2(b, 3.0H)(—NHCH$_2$CONHCH(CH$_2$C$_6$H$_5$)NHCH(CH(CH$_3$)CH$_2$(CH$_3$))COOCH$_2$CH$_3$, —OCH$_2$CH$_2$O(CH$_2$CH$_2$O)$_6$CH$_3$)

δ 4.2-4.5(b, 0.8H)(—NHCH$_2$CONHCH(CH$_2$C$_6$H$_5$)NHCH(CH(CH$_3$)CH$_2$(CH$_3$))COOCH$_2$CH$_3$)

δ 4.5-4.7(b, 0.5H)(—NHCH$_2$CONHCH(CH$_2$C$_6$H$_5$)NHCH(CH(CH$_3$)CH$_2$(CH$_3$))COOCH$_2$CH$_3$)

δ 6.8-7.2(b, 3.5H)(—NHCH$_2$CONHCH(CH$_2$C$_6$H$_5$)NHCH(CH(CH$_3$)CH$_2$(CH$_3$))COOCH$_2$CH$_3$)

$^{31}$P NMR spectral data (CDCl$_3$, ppm): δ −0.306

Mean molecular weight (Mw, Eluent: 0.1% (w/v) tetrabutylammonium bromide in tetrahydrofuran): 11,000

Gelation Temperature: 32° C.

Example 13

Preparation of poly[(methoxy poly(ethylene glycol) 350)(glycylphenylalanylaspartic diethyl ester)phosphazene], [NP(MPEG350)$_{1.1}$(GlyPheAspEt$_2$)$_{0.9}$]$_n$ By using MPEG350 (3.01 g, 8.6 mmol), sodium hydride (0.22 g, 9.03 mmol), poly(dichlorophosphazene) (3% AlCl$_3$, 1.00 g, 8.6 mmol), triethylamine (6.3 g, 61.9 mmol) and glycylphenylalanylaspartic diethyl ester (4.06 g, 10.32 mmol), [NP{(OCH$_2$CH$_2$)$_7$CH$_3$}$_{1.1}${NHCH$_2$CONHCH(CH$_2$C$_6$H$_5$)NHCH(CH$_2$COOCH$_2$CH$_3$)COOCH$_2$CH$_3$}$_{0.9}$]$_n$, was obtained by the same method as described in Example 1 with an yield of 52%.

Empirical formula: C$_{34}$H$_{65}$N$_4$O$_{17}$P

Elemental Analysis

Found: C, (48.68), H, (6.79), N, (7.51). Calculated: C, (48.89), H, (7.89), N, (6.19).

$^1$H NMR spectral data (CDCl$_3$, ppm):

δ 0.9-1.3(b, 3.9H) (—NHCH$_2$CONHCH(CH$_2$C$_6$H$_5$)NHCH(CH$_2$COOCH$_2$CH$_3$)COOCH$_2$CH$_3$)

δ 2.5-3.0(b, 2.0H) (—NHCH$_2$CONHCH(CH$_2$C$_6$H$_5$)NHCH(CH$_2$COOCH$_2$CH$_3$)COOCH$_2$CH$_3$)

δ 3.1-3.2(s, 3.0H) (—OCH$_2$CH$_2$O(CH$_2$CH$_2$O)$_6$CH$_3$)

δ 3.2-3.6(b, 14.7H) (—OCH$_2$CH$_2$O(CH$_2$CH$_2$O)$_6$CH$_3$, —NHCH$_2$CONHCH(CH$_2$C$_6$H$_5$)NHCH(CH$_2$COOCH$_2$CH$_3$)COOCH$_2$CH$_3$)

δ 3.7-4.2(b, 3.2H) (—OCH$_2$CH$_2$O(CH$_2$CH$_2$O)$_6$CH$_3$, —NHCH$_2$CONHCH(CH$_2$C$_6$H$_5$)NHCH(CH$_2$COOCH$_2$CH$_3$)COOCH$_2$CH$_3$)

δ 4.2-4.8(b, 0.7H) (—NHCH$_2$CONHCH(CH$_2$C$_6$H$_5$)NHCH(CH$_2$COOCH$_2$CH$_3$)COOCH$_2$CH$_3$)

δ 6.8-7.2(b, 2.7H) (—NHCH$_2$CONHCH(CH$_2$C$_6$H$_5$)NHCH(CH$_2$COOCH$_2$CH$_3$)COOCH$_2$CH$_3$)

$^{31}$P NMR spectral data (CDCl$_3$, ppm): δ 0.824

Mean molecular weight (Mw, Eluent: 0.1% (w/v) tetrabutylammonium bromide in tetrahydrofuran): 120,000

Lower critical solution temperature: 47° C.

Example 14

Preparation of poly[(methoxy poly(ethylene glycol) 350)(glycylphenylalanylleucylglycine ethyl ester) phosphazene], [NP(MPEG350)$_{1.0}$(GlyPheLeuGlyEt)$_{1.0}$]$_n$ By using MPEG350 (3.01 g, 8.6 mmol, sodium hydride (0.22 g, 9.03 mmol), poly(dichlorophosphazene) (3% AlCl$_3$, 1.00 g, 8.6 mmol), triethylamine (6.3 g, 61.9 mmol) and glycylphenylalanylleucylglycine ethyl ester (4.34 g, 10.32 mmol), [NP{(OCH$_2$CH$_2$)$_7$CH$_3$}$_{1.0}${NHCH$_2$CONHCH(CH$_2$C$_6$H$_5$)NHCH(CH$_2$CH(CH$_3$)$_2$)NHCH$_2$—COOCH$_2$CH$_3$}$_{1.0}$]$_n$, was obtained by the same method as described in Example 1 with an yield of 53%.

Empirical formula: C$_{36}$H$_{67}$N$_5$O$_{15}$P

Elemental Analysis

Found: C(52.186), H, (8.159), N, (7.669). Calculated: C, (51.56), H, (7.96), N, (8.25).

$^1$H NMR spectral data (CDCl$_3$, ppm):

δ 0.5-1.1(b, 4.9H) (—NHCH$_2$CONHCH(CH$_2$C$_6$H$_5$)NHCH(CH$_2$CH(CH$_3$)$_2$)—NHCH$_2$COOCH$_2$CH$_3$)

δ 1.1-1.4(b, 3.4H) (—NHCH$_2$CONHCH(CH$_2$C$_6$H$_5$)NHCH(CH$_2$CH(CH$_3$)$_2$)—NHCH$_2$COOCH$_2$CH$_3$)

δ 1.4-1.6(b, 1.9H) (—NHCH$_2$CONHCH(CH$_2$C$_6$H$_5$)NHCH(CH$_2$CH(CH$_3$)$_2$)—NHCH$_2$COOCH$_2$CH$_3$)

δ 2.8-3.2(b, 1.2H) (—NHCH$_2$CONHCH(CH$_2$C$_6$H$_5$)NHCH(CH$_2$CH(CH$_3$)$_2$)—NHCH$_2$COOCH$_2$CH$_3$)

δ 3.3-3.4(s, 3.0H) (—OCH$_2$CH$_2$O(CH$_2$CH$_2$O)$_6$CH$_3$)

δ 3.4-3.8(b, 20.8H) (—OCH$_2$CH$_2$O(CH$_2$CH$_2$O)$_6$CH$_3$, —NHCH$_2$CONHCH(CH$_2$C$_6$H$_5$)NHCH(CH$_2$CH(CH$_3$)$_2$)NHCH$_2$COOCH$_2$CH$_3$)

δ 3.8-4.3(b, 5.3H) (—OCH$_2$CH$_2$O(CH$_2$CH$_2$O)$_6$CH$_3$, —NHCH$_2$CONHCH(CH$_2$C$_6$H$_5$)NHCH(CH$_2$CH(CH$_3$)$_2$)NHCH$_2$COOCH$_2$CH$_3$)

δ 6.8-7.5(b, 5.0H) (—NHCH$_2$CONHCH(CH$_2$C$_6$H$_5$)NHCH(CH$_2$CH(CH$_3$)$_2$)——NHCH$_2$COOCH$_2$CH$_3$)

$^{31}$P NMR spectral data (CDCl$_3$, ppm): δ 2.71

Mean molecular weight (Mw, Eluent: 0.1% (w/v) tetrabutylammonium bromide in tetrahydrofuran): 140,000

Gelation Temperature: 40° C.

Example 15

Hydrolysis of Thermosensitive Poly(organophosphazenes)

The hydrolysis of the thermosensitive poly(organophosphazenes) of the present invention was carried out as follows:
Poly(organophosphazenes) (20 mg) were dissolved in the buffer solutions, each having pH of 5, 7.4 and 10, which were incubated in a water bath at 37° C. Time-dependent hydrolytic degradation of the polymers were determined in terms of molecular weight decrease of the polymers by gel permeation chromatography. The results are shown in Table 1. According to the table, the compounds prepared in examples of the present invention have a half-life of approximately 25 to 30 days in the neutral aqueous solution, thus indicating that they are suitable for drug delivery systems.

TABLE 1

| Polymers | pH | Day 0 | Day 5 | Day 10 | Day 15 | Day 20 | Day 25 | Day 30 | Day 35 | Day 40 |
|---|---|---|---|---|---|---|---|---|---|---|
| | | | | | Molecular Weight Changes (%) | | | | | |
| Example 3 | 5 | 100 | 74.0 | 63.0 | 39.1 | 36.3 | 34.2 | 32.5 | 30.0 | 27.1 |
| | 7.4 | 100 | 85.0 | 72.7 | 57.3 | 57.7 | 54.7 | 54.9 | 49.1 | 46.8 |
| | 10 | 100 | 100 | 90.6 | 75.2 | 75.9 | 75.9 | 63.8 | 62.6 | 58.4 |
| Example 4 | 5 | 100 | 68.0 | 55.0 | 31.6 | 31.2 | 28.5 | 26.8 | 24.8 | 23.2 |
| | 7.4 | 100 | 82.0 | 70.1 | 51.6 | 53.5 | 49.2 | 48.4 | 42.5 | 39.4 |
| | 10 | 100 | 88.0 | 77.0 | 73.8 | 63.5 | 62.1 | 56.1 | 50.8 | 47.2 |
| Example 9 | 5 | 100 | 63.0 | 56.0 | 37.9 | 35.0 | 33.2 | 30.6 | 28.9 | 28.9 |
| | 7.4 | 100 | 76.0 | 72.0 | 56.7 | 62.0 | 56.7 | 51.8 | 48.8 | 51.2 |
| | 10 | 100 | 85.0 | 85.0 | 78.1 | 76.0 | 72.2 | 58.1 | 55.3 | 57.2 |

Example 16

Figure 1A:
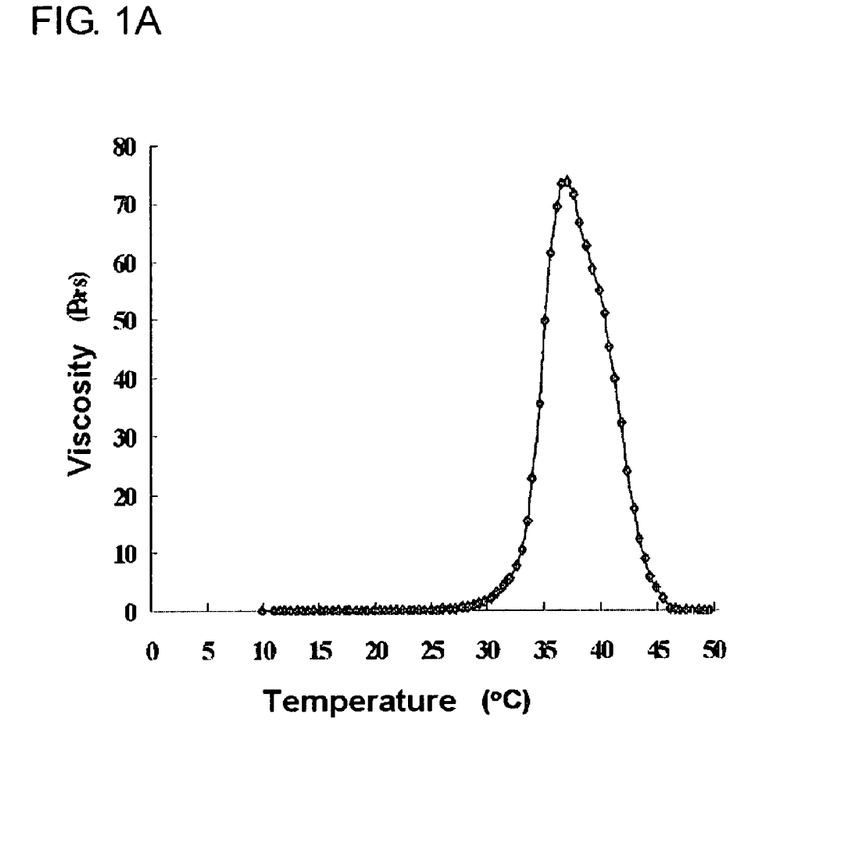
Figure 1B:
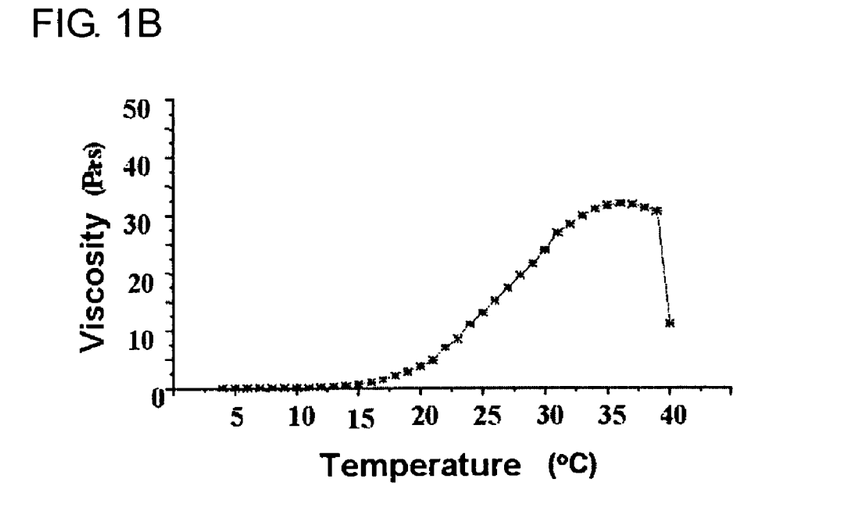

Test for the Strength of Polyphosphazene Gel Depending on the Hydrophobic Groups The temperature-dependent viscosities of 10% aqueous solutions of Example 12, [NP(MPEG350)$_{1.0}$(GlyPhelle Et)$_{1.0}$]$_n$ of the present invention and of the conventional polymer containing an amino acid, [NP(AMPEG350)(IleEt)]$_n$ (Youn Soo Sohn, et al. Macromolecules, 2002, 35, 3876) were measured, and the results are shown in FIGS. 1(a) and 1(b). As can be seen from the figures, the gel strength of the oligopeptide-containing polymer with high hydrophobicity of the present invention is more than twice higher than that of the amino acid-containing polymer.

Example 17

Local Tolerance Test for Poly(organophosphazenes) as Drug Delivery System

A poly(organophosphazene) and a protein drug (human growth hormone, hGH) were combined, and the stability of the drug and its local inflammation were tested.

Figure 2:
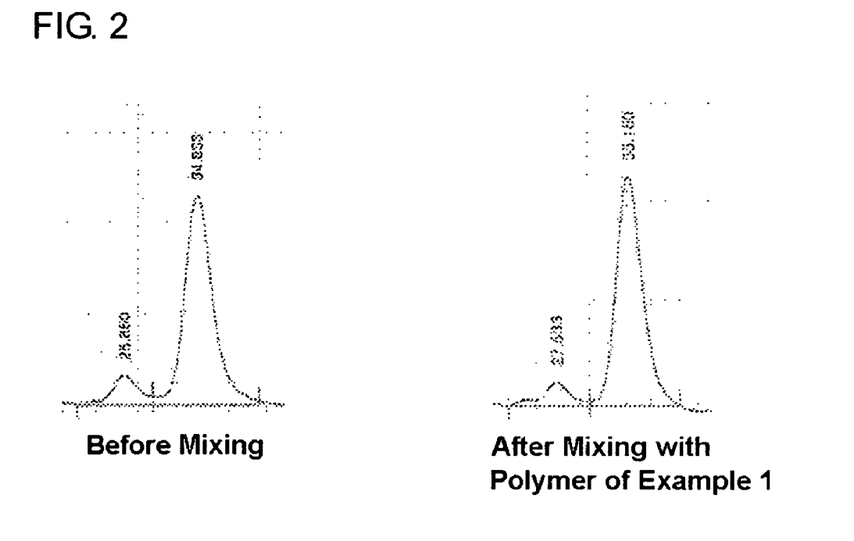

The drug (7.5 mg/ml) was added to the 12.5% aqueous solution of the polymer from Example 1, and whether or not there is any interaction between the drug and the polymer was determined using reversed phase high performance liquid chromatography (RP-HPLC). Comparing the chromatograms in FIG. 2 measured before and after the polymer and drug were mixed, it is shown that the polymer of the present invention does not affect the stability of the drug.

Moreover, 1 ml of the polymer solution with (+hGH) and without the drug (−hGH) was subcutaneously injected to the shoulder of rabbits, and any inflammation on the skin and muscle was examined. The results of such observations summarized in Table 2 showed no skin reaction (e.g. hemorrhage, edema, necrosis, etc.), and according to the autopsy opinion, no changes (color change, adhesion, spot, etc.) related to the inflammation were observed. Therefore, the poly(organophosphazene) of the present invention does not have local inflammation and was identified to have biocompatibility.

TABLE 2

| Number of Days | Classification | Symptoms and Skin Reactions | Autopsy Opinion Skin | Muscle | Remarks |
|---|---|---|---|---|---|
| 3 | (−hGH) | — | Sample was distributed (0.8 cm) | — | No difference whether or not |
| | (+hGH) | — | Sample was distributed (0.8 cm) | — | the drug was contained in |
| 7 | (−hGH) | — | Sample was slightly distributed | — | the sample |
| | (+hGH) | — | Sample was slightly distributed | — | |

Example 18

Test for Controlled Release of a Protein Drug from Poly(organophosphazenes)

Figure 3:
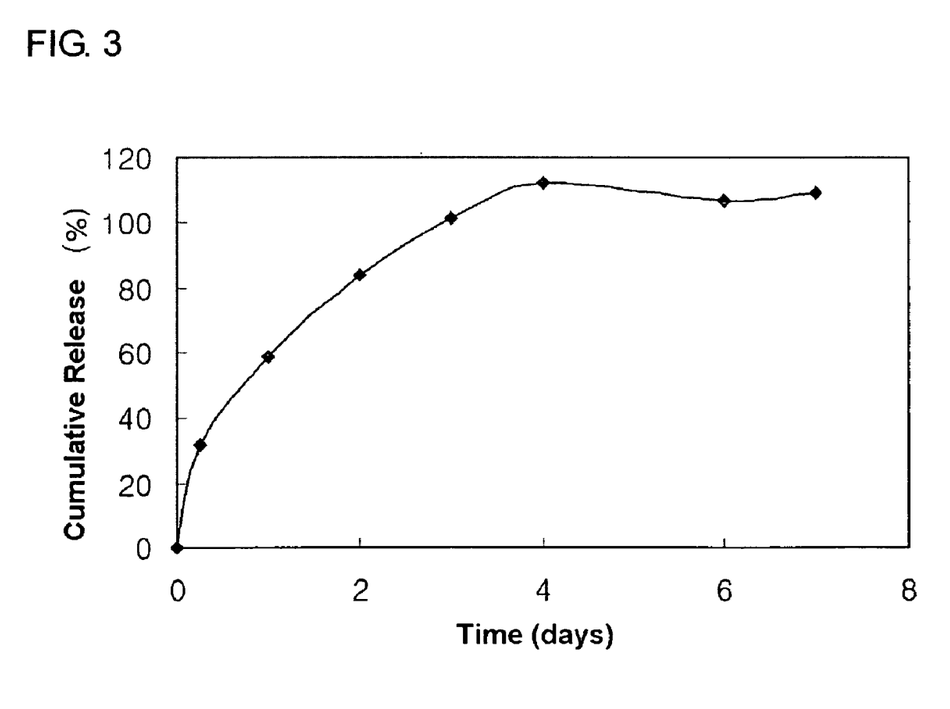

The drug-release experiment of poly(organophosphazenes) containing human growth hormone (hGH) was performed in vitro as follows. To 12.5% aqueous solution of the present polymer from Example 2 was added hGH at a concentration of 1 mg/ml, and then the drug solution was heated to 37° C. to precipitate the hGH-entrapped polymer, which exhibited high entrapment efficiency (>95%). The drug-containing polymer precipitate was dissolved in Dulbecco's phosphate buffered saline (DPBS) solution, and then the released amounts of hGH from the DPBS solution were measured using size exclusion high performance liquid chromatography (SEC-HPLC). The results are shown in FIG. 3, which shows that the initial burst effect (30.8%) was not so high and the drug was controlled-releasing during a period of 7 days with the total amount of cumulative release of 106.4%. Therefore, it was found that the polymer of Example 2 shows a drug-releasing behavior suitable for a one-week drug formulation.

According to the present invention, amphiphilic poly(organophosphazenes) with greatly improved thermosensitivity and biocompatibility and a preparation method thereof were provided. The poly(organophosphazenes) of the present invention are biocompatible, thermosensitive and biodegradable, and their thermosensitivity can be controlled in a wide range of temperature including body temperature by varying the molecular structure and mole fraction of the oligopeptide side group of the present polymer. Accordingly, it is expected that the polymer of the present invention may be practically applied in various ways including both local and systemic delivery of hydrophobic drugs such as proteins or polypeptides and low-solubility drugs such as Taxol.

What is claimed is:

1. Poly(organophosphazenes) represented by the following Formula 1:

wherein R is a methyl or ethyl group;
R' is selected from the group consisting of $CH_2CH(CH_3)_2$, $CH_2C_6H_5$, $CH(CH_3)CH_2CH_3$ and $CH_3$;
R" is selected from the group consisting of $CH_2COOR$, $CH_2CH_2COOR$, $CH_2CH(CH_3)_2$, $CH_2C_6H_5$, $CH(CH_3)CH_2CH_3$ and $CH_3$;
R'" is a group selected from the group consisting of $CH_2COOR$, $CH_2CH_2COOR$ and H, wherein R is the same as defined above;
n is a number between from 30 to 100;
x is a number selected from the integers of 3, 4, 7, 12 and 16;
y is a number between from 0.5 to 1.5;
a equals to 1;
b and c equal to 0 or 1.

2. A method of preparing poly(organophosphazenes) represented by Formula 1, comprising the steps of:
(1) reacting poly(ethylene glycol) represented by Formula 4 with poly(dichlorophosphazene) represented by Formula 3; and
(2) reacting the product obtained in step (1) with an oligopeptide ester represented by Formula 6 or its acid salt;

wherein R is a methyl or ethyl group;
R' is selected from the group consisting of $CH_2CH(CH_3)_2$, $CH_2C_6H_5$, $CH(CH_3)CH_2CH_3$ and $CH_3$;
R" is selected from the group consisting of $CH_2COOR$, $CH_2CH_2COOR$, $CH_2CH(CH_3)_2$, $CH_2C_6H_5$, $CH(CH_3)CH_2CH_3$ and $CH_3$;
R'" is a group selected from the group consisting of $CH_2COOR$, $CH_2CH_2COOR$ and H,
wherein R is the same as defined above;
n is a number between from 30 to 100;
x is a number selected from the integers of 3, 4, 7, 12 and 16;
y is a number between from 0.5 to 1.5;
a equals to 1;
b and c equal to 0 or 1.

3. The method according to claim 2, wherein in step (1), a sodium salt represented by Formula 5 is used, instead of the poly(ethylene glycol) represented by Formula 4;

4. The method according to claim 2, wherein step (1) is carried in the presence of triethylamine.

5. The method according to claim 2, wherein a solvent for step (1) is selected from the group consisting of tetrahydrofuran, benzene and toluene.

6. The method according to claim 2, wherein in step (1), mole ratio between the poly(ethylene glycol) or its sodium salt and the poly(dichlorophosphazene) ranges from 0.5 to 1.5.

7. The method according to claim 2, wherein the acid salt in step (2) is hydrochloride, oxalate or trifluoroacetate.

8. The method according to claim 2, wherein in step (2), 1.0 to 1.5 equivalents of oligopeptide ester represented by Formula 6 or its acid salt are used per one equivalent of remaining chlorine atoms of the product obtained from step (1).

9. The method according to claim 2, wherein step (2) is carried in the presence of 3 to 6 equivalents of triethylamine.

10. The method according to claim 2, wherein a solvent for step (2) is chloroform.

11. The method according to claim 2, wherein subsequent to step (2), further comprising the steps of:
(a) filtering the reaction mixture;
(b) concentrating the filtrate obtained in step (a);
(c) re-dissolving the concentrate obtained in step (b) in tetrahydrofuran;
(d) inducing precipitation by adding ethyl ether or hexane to the solution obtained from step (c);
(e) filtering the precipitate obtained in step (d); and
(f) dialyzing the filtered precipitate in distilled water, thereby obtaining purified poly(organophosphazene).

* * * * *